(12) United States Patent
Wilensky et al.

(10) Patent No.: US 6,721,446 B1
(45) Date of Patent: Apr. 13, 2004

(54) IDENTIFYING INTRINSIC PIXEL COLORS IN A REGION OF UNCERTAIN PIXELS

(75) Inventors: Gregg D. Wilensky, San Jose, CA (US); Martin E. Newell, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/298,872

(22) Filed: Apr. 26, 1999

(51) Int. Cl.7 ................................................. G06K 9/00
(52) U.S. Cl. ........................ 382/162; 345/613; 358/531
(58) Field of Search .......................... 382/100, 162, 382/164, 165, 167, 173, 181, 190, 194, 195, 212, 213, 282, 283; 345/308, 156, 164, 440, 443, 581, 589, 639, 634, 419–421; 348/578; 707/104.1; 358/500, 515, 518, 531

(56) References Cited

U.S. PATENT DOCUMENTS

| | | | | |
|---|---|---|---|---|
| 4,899,136 A | * | 2/1990 | Beard et al. | 345/156 |
| 4,941,182 A | * | 7/1990 | Patel | 382/141 |
| 4,952,051 A | * | 8/1990 | Lovell et al. | 352/187 |
| 5,063,375 A | * | 11/1991 | Lien et al. | 345/616 |
| 5,113,251 A | * | 5/1992 | Ichiyanagi et al. | 358/500 |
| 5,142,616 A | * | 8/1992 | Kellas et al. | 345/634 |
| 5,226,163 A | * | 7/1993 | Karsh et al. | 707/200 |
| 5,239,383 A | * | 8/1993 | Ikeda et al. | 358/300 |
| 5,388,206 A | * | 2/1995 | Poulton et al. | 345/505 |
| 5,495,576 A | * | 2/1996 | Ritchey | 345/420 |
| 5,710,839 A | | 1/1998 | Cok | |
| 5,734,852 A | * | 3/1998 | Zias et al. | 345/744 |
| 5,777,608 A | * | 7/1998 | Lipovski et al. | 345/519 |
| 5,812,214 A | | 9/1998 | Miller | 348/587 |
| 5,872,902 A | * | 2/1999 | Kuchkuda et al. | 345/615 |
| 6,167,206 A | * | 12/2000 | Hylen | 396/316 |
| 6,208,386 B1 | * | 3/2001 | Wilf et al. | 348/578 |

FOREIGN PATENT DOCUMENTS

EP   0 771 107 A1   2/1997   .......... H04N/5/275

OTHER PUBLICATIONS

Smith and Blinn, "Blue Screen Matting," Computer Graphics Proceedings, Annual Conference Series, pp. 259–268, 1996.

Adobe Photoshop 5.0 User Guide, Chapter 7, pp. 137–153; Chapter 10, pp. 249–251.

Rosenfield et al. "Digital Picture Processing", Digital Picture Processing, Orlando, Academic Press, US, vol. 1, 1982, Page 6 XP002246743, Section 7.2, "Inverse Filtering", pp. 276–281.

* cited by examiner

Primary Examiner—Jayanti K. Patel
(74) Attorney, Agent, or Firm—Fish & Richardson P.C.

(57) ABSTRACT

A digital image that includes first and second regions is processed. An intrinsic color of a given pixel located in an area of interest that is adjacent to at least one of the first and second regions is estimated by extrapolating from colors of multiple pixels in one of the first and second regions and multiple pixels in the other of the two regions.

14 Claims, 7 Drawing Sheets

FIG._1

PLEASE CHOOSE MODE OF OPERATION:

A) SELECT OUTLINE REPRESENTING UNCERTAIN REGION — 10

B) SELECT OUTLINE REPRESENTING WHOLE FOREGROUND REGION — 12

C) SELECT OUTLINE REPRESENTING WHOLE BACKGROUND REGION — 14

IDENTIFYING INTRINSIC PIXEL COLORS IN A REGION OF UNCERTAIN PIXELS

FIELD OF THE INVENTION

This invention relates to identifying intrinsic pixel colors and pixel opacities in a region of uncertain pixels.

BACKGROUND OF THE INVENTION

A common task in the manipulation of digital images is the removal of one or more foreground objects from a scene and the composition of this object with a new background image. This is typically a difficult task for several reasons:

1) blending of an object with the background scene: a pixel at an edge of an object may have contributions from both the foreground and the background, its color is consequently a blend of the two regions;
2) object complexity: even for objects with hard edges, the object border often contains detail that requires tedious effort to define manually; and
3) combinations of 1) and 2): an example is hair or fur, the shapes are complex and regions with thin fibers lead to color blending.

In general, the problem does not have a simple unambiguous solution. The movie industry has handled this by simplifying the scene, by filming objects or people against a simple background (blue screen) having as uniform a color as possible. Techniques have been developed to produce approximate solutions in this situation. Software products that can be used to mask an object, require a great deal of manual effort for complex objects such as subjects with hair. Existing products also enable a degree of color extraction from simplified background scenes by applying operations to the color channels.

SUMMARY OF THE INVENTION

In general, in one aspect, the invention features processing a digital image that includes first and second regions by estimating an intrinsic color of a given pixel located in an area of interest that is adjacent to at least one of the first and second regions. The estimating includes extrapolating from colors of multiple pixels in one of the first and second regions and multiple pixels in the other of the two regions.

Implementations of the invention may include one or more of the following features. The original color of the given pixel relates to the original colors of pixels in both the first and second regions. The estimated intrinsic color of the given pixel relates to original colors in only one or the other of the first and second regions. The area of interest includes one of the first and second regions; or is adjacent to both of the first and second regions. The first region is a foreground object and the second region is a background.

The first and second regions have any arbitrary degree of color variation in the visible spectrum over a spatial scale that is on the same order of magnitude or smaller than the minimum span of the area of interest. The estimating includes analyzing both the color and spatial proximity of pixels in the first and second regions.

The estimating includes extrapolating from the closest pixels in the first and second regions; or flowing colors into the area of interest from one or both of the first and second regions. The flowing of colors includes averaging of color values for each of a set of pixels in the first region and a set of pixels in the second region. The digital image includes layers of pixel information and the estimating is based on pixel information in only one of the layers; or in other implementations on pixel information in a composition of all the layers.

An opacity value is determined for the given pixel, indicative of the extent to which the intrinsic color of the given pixel relates to original colors in the first and second regions, based on a result of the estimating of the intrinsic color. The given pixel includes original opacity information, and the opacity value is also based on the original opacity information. In some implementations the opacity determination includes use of a neural network trained on the image original colors and estimated intrinsic colors. The opacity values are used to composite one of the first and second regions with another digital image.

The estimating includes extrapolating estimates of intrinsic colors of the first and second regions using searches in color space and image coordinate space. The estimating assumes a linear blending model. The estimating includes flowing colors from edges of the area of interest to fill the area of interest with estimates of the colors of the first and second regions.

Estimating the intrinsic color includes determining two color sample sets for the given pixel, each of the color sample sets being associated with one of the first and second regions, and estimating the intrinsic color based on the two color sample sets. The original color of the given pixel is compared with colors in the color sample sets. A single color is selected from each of the color sample sets based on an error minimization technique.

In general, in another aspect, the invention features enabling a user to paint an area of the digital image to identify at least an area of interest adjacent to at least one of a first region and a second region. After the user has defined the area of interest, the intrinsic colors of pixels in the area of interest are estimated based on color information for pixels in the first region and the second region.

Implementations of the invention may include one or more of the following features. The painting is done with a brush tool that can be configured by the user. The painted area can be built up by repeated painting steps and portions of the painted area can be erased by the user interactively. The user paints the area of interest and separately identifies a location that is in one of the first and second regions. Or the user paints at least one of the first and second regions and the area of interest and separately identifies a color associated with one of the first and second regions. The user designates one of the first and second regions by identifying a pixel location in that region. The user identifies the color by applying an eyedropper tool to one pixel or a set of pixels in the one region. One of the regions is flood filled based on the identified pixel location to designate that region as a foreground. The painted area may be modified by a user interactively and repeatedly. The user is enabled to paint additional areas of interest between other pairs of first and second regions.

In general, in another aspect, the invention features receiving a mask associated with an area of interest in a digital image, the mask including values representing opacities of pixels in the region of interest with respect to an adjacent region of interest. Intrinsic colors for the pixels are estimated based on the mask.

In general, in another aspect, the invention features enabling a user to control an original extraction by manipulating a brush on a display of the image, enabling the user to control a touch up extraction following the original extraction, and considering a pixel identified for touch up extraction only if the pixel was of uncertain color in the original extraction.

Implementations of the invention may include one or more of the following features. An intrinsic color is determined for each of the pixels that were of uncertain color based on a forced foreground or background color. The forced color is selected by the user or is determined automatically from the original colors within the foreground region.

In general, in another aspect, the invention features determining, for each pixel in an area of interest in a digital image, the nearest pixel in a first region of the image that is adjacent to the area of interest and the nearest pixel in a second region of the image that is adjacent to the area of interest. A processing area is defined that is smaller than the image. A pixel window is defined that is smaller than the defined processing area. The processing area is scanned at a succession of overlapping positions that together span the image. At each overlapping position of the processing area, the pixel window is scanned across the processing area. At each position of scanning of the pixel window, stored information for pixels in the window is updated, the stored information relating to nearest pixels in the first and second regions.

Implementations of the invention may include one or more of the following features. The processing area includes a rectangle twice as long is high, and in each of the succession of positions the processing area is offset from the prior position by half the length of the rectangle. The pixel window includes a square. The scanning of the processing area and the scanning of the pixel window occur in both forward and backward passes that span the image.

In general, in another aspect, the invention features a method for a user to extract an object from a background in an image. The image is displayed. A painting tool is selected and its characteristics adjusted. The painting tool is used to paint a swath around the object. The swath includes pixels whose membership in the object or the background are uncertain and include pixels that with certainty belong to the object and to the background. At least one pixel is marked that is known to belong to the object or the background. A program is invoked to perform the extraction. The quality of the extraction is observed. Depending on the observation, a painting tool is used to control a touch-up extraction.

Advantages

Complex objects in complex scenes can be accurately extracted, dropping out the background pixels to zero opacity (totally transparent). Objects with complex topologies (lots of holes) can be extracted. A simple user interface allows the user to select all of the regions that are to be designated as foreground by an intuitive process of clicking the mouse over each region, obtaining immediate visual feedback of the selected regions. Only a small fraction of the memory needed to store the image is required to be resident in the computer's (R)andom (A)ccess (M)emory at any given time. This is a key advantage over more obvious approaches to solving this problem, which require storing and processing data whose size is comparable to multiple copies of the image. For example, a 5000 by 5000 pixel RGB image with transparency information contains approximately 100 (M)ega (B)ytes of data. More obvious implementation of the methods might require storing in RAM several hundred MB at once. The preferred embodiment of this invention requires less than 2 MB, and this requirement can be decreased even further in alternative embodiments.

The method achieves an effective balance between speed of operation and memory requirements. More obvious implementations are either much slower (and scale poorly as the image size is increased) or require much more RAM. The user has the flexibility to highlight the object in one step as well as the ease of modifying the outline by erasing or by adding additional paint. In some implementations, the user need not preselect the foreground and background colors. The masking and extracting of objects from digital images is achieved with high accuracy. Multiple objects can be extracted from an image in a single step.

BRIEF DESCRIPTION OF THE DRAWINGS

Other advantages and features will become apparent from the following description and from the claims.

DESCRIPTION OF THE PREFERRED EMBODIMENTS

It is common for one working with digital images to extract objects from the image. The user selects an object to be removed from a scene by outlining its boundary. However, this outline covers pixels whose origins are difficult to ascertain (are they foreground or background?) either because it would be too much work or because foreground and background colors are blended together. As a result, there is a region whose pixels are in question with respect to their origin. One way to answer this question is to fill the uncertain region with colors based only on the colors which bound the region (within some small distance of the boundary). Having so estimated the intrinsic colors, the opacities of the pixels in questions can be estimated from a given blending model, thereby completing all of the information needed to complete the extraction. Therefore, masking/color extraction boils down to filling in an unknown region for which there is some color information that is the result of possible blending of foreground and background. There are several ways to accomplish the blending.

The following terms have the indicated meanings:

Digital Image: A collection of digital information that may be cast into the form of a visual image. Digital images may include photographs, art work, documents, and web pages, for example. Images may be obtained from digital cameras, digital video, scanners, and fax, for example. The images may be two-dimensional or of higher dimensionality. For example, three-dimensional images may include representations of three-dimensional space, or of two-dimensional movies, where the third dimension is time.

Pixel: An element of a digital image which has a specific location in the image and contains color information for that location.

Masking: The process of cutting out a portion of an image so that an object in the image can be blended into a new background or further manipulated. Masking typically involves defining an opacity mask which specifies the degree to which each image pixel represents foreground object or background scene. It also involves extraction, for each pixel, of the object's intrinsic color, which can be different from the observed color.

Color Extraction (or color decontamination): The process of determining the intrinsic color for each pixel which makes up an object in a digital image. The intrinsic color may differ from the observed color because of blending of the foreground and background light into one pixel area during the imaging process. Another cause of color difference is partial transmission of the background through a transparent or translucent foreground object. These can both be classified as background bleed-through. General color spill is another mechanism for contamination in which background light is reflected off foreground objects.

Compositing: The process of blending two images, for example, the over-laying of the cutout object image onto a new background image scene.

Selection (or opacity) mask: A set of values, one for each pixel in a digital image, which indicate the degree to which each pixel belongs to the object or to a background scene. A value of 1 indicates that the pixel belongs completely to the object. A value of 0 indicates that it belongs completely to the background scene. Values between 0 and 1 indicate partial membership in both. The compositing model determines how this value is used to blend object pixels with background scene pixels to obtain a single composite image.

Intrinsic color: The color (at any given pixel in an image) that an object in the image would present were it not blended with the background. The blending can arise either from the imaging optics in the process of capturing a digital image or from the composition of multiple image layers. Object colors may also be blended with background colors because of "color spill", in which light from background portions of a scene is reflected off of the object. For pixels that are not blended this is the observed color. For pixels that are blended with the background, (including blending due to color spill) this is a color that differs from the observed color. Determining this color is called color extraction.

Uncertain region (also referred to as the highlighted region): That portion of the image for which the intrinsic colors and/or opacities of the pixels are uncertain. "Highlight" simply refers to the method of selecting these pixels by highlighting them with a brush tool.

Color: Used here to represent a vector of values which characterize all or a portion of the image intensity information. It could represent red, green, and blue intensities in an RGB color space or a single luminosity in a Grayscale color space. Alternatively, it could represent alternative information such as CMY, CMYK, Pantone, Hexachrome, x-ray, infrared, gamma ray intensities from various spectral wavelength bands. It may in addition represent other modalities of information, such as acoustic amplitudes (sonar, ultrasound) or (M)agnetic (R)esomance (I)maging amplitudes which are not measurements of electromagnetic radiation.

Figure 1:
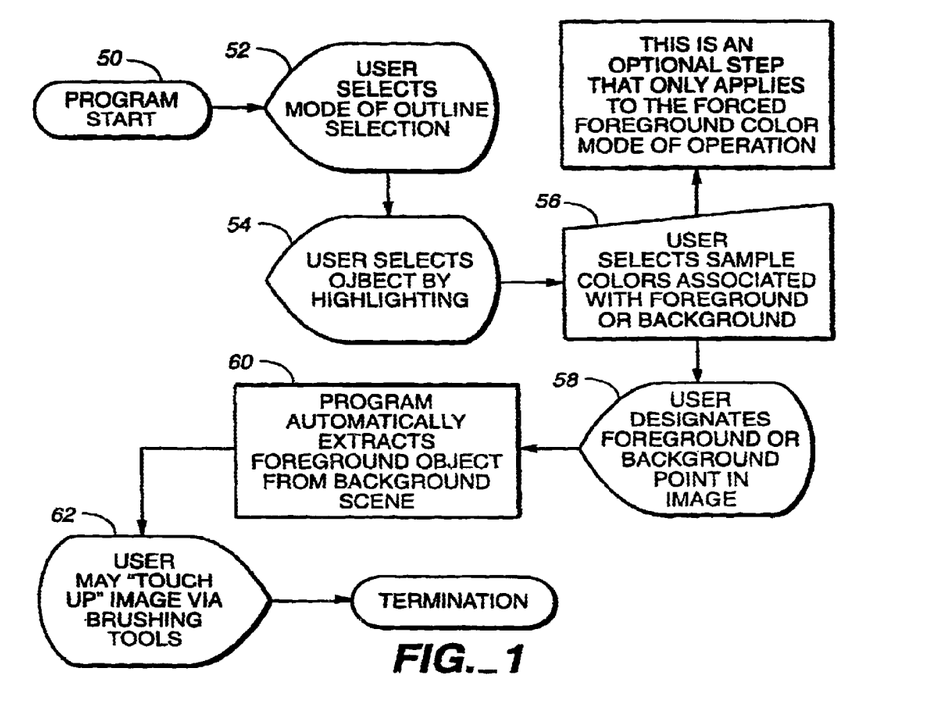
FIGS. 1 and 11 are flow charts.

FIG. 1 is a flow chart of user and program steps. Each step following program start 50 is described below.

User Selects Mode of Outline Selection 52

Figure 2:
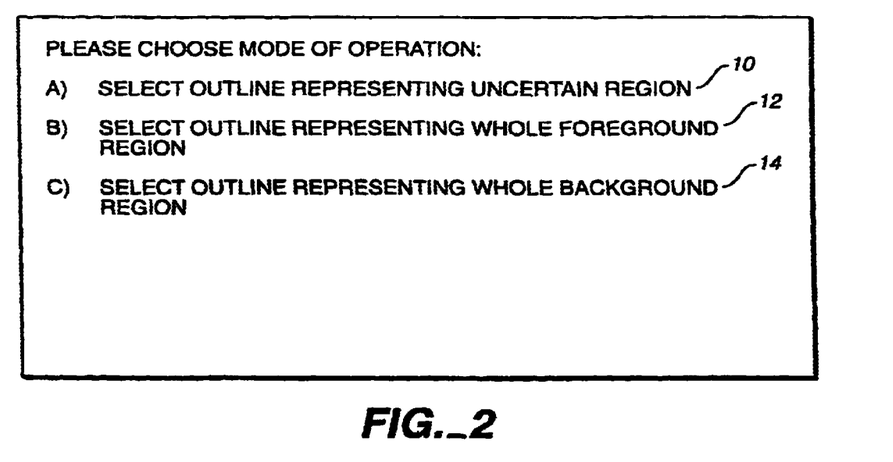
FIGS. 2, 3, 4, 5, 6, 7, 8, 9, 10, 12, 13, and 14 are photographic images.

As shown by the screen shot in FIG. 2, a user interface dialog box allows the user to choose one of three modes 10, 12, 14 of outline selection. There are three possibilities:

A) The highlighted boundary region may represent one or more uncertain regions containing pixels whose intrinsic color and/or opacity is unknown. For this alternative, the selection must be "closed curves" so that foreground regions can be automatically distinguished from background regions. Closed curves include those that have the topology of a circle and those that are closed by the edges of the image. Higher genus topologies are handled in two possible ways (as determined by the user's choice):

1) Extract a single object at a time; gaps in the outline are assumed to be background regions. This is the natural mode of operation for outlining an animal with fur or a person with hair. Gaps in the hair are naturally interpreted as background. For this mode the user designates a foreground point on the object to be extracted. From that point, all of the connected image region bounded by the highlighted region is assumed to be foreground; the rest of the image, except for the highlighted region is assumed to be background.

2) Extract multiple objects in a single operation. This is done by highlighting a closed curve around each object. Gaps in the highlighted region are still treated as background, but any gaps within the gaps are treated as foreground. For this mode, the interpretation oscillates back and forth between foreground and background as one crosses outline regions. An alternative implementation allows the user to designate a single point in each of the objects (or, more generally, in each of the closed foreground regions) by multiple mouse clicks. From each point, all connected image regions bounded by the outlines are assumed to be foreground. All image regions which are not so designated as foreground and are not designated by the highlighted region are assumed to be background.

B) The highlighted region represents the whole foreground region and the boundary region. There are two possibilities:

1) The foreground color is chosen manually by the user (this is good for extracting water fountains, large clumps of trees, for example). For this option, the selection does not have to be "closed curves".

2) The selection is turned into an outline by growing inward. The selection must be "closed curves".

C) The same as "B" with foreground and background roles switched.

User Selects Object by Highlighting 54

Figure 3:
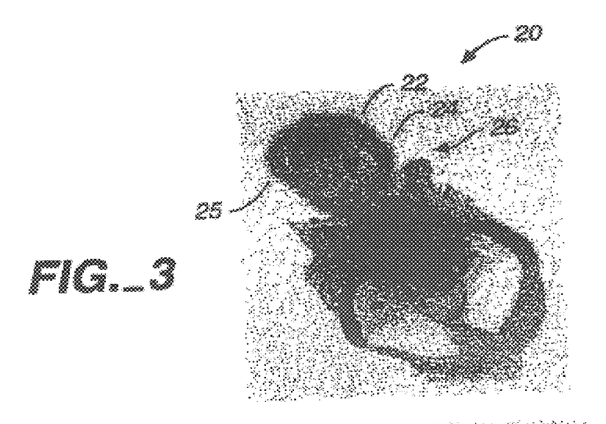

In FIG. 3, a photo 20 is shown with the foreground 22 (baby's head) highlighted by the user. If the user wishes to remove an object from a scene, he or she highlights the border of the object by marking the outline 24 (boundary region) using a brush tool or other selection tools. The displayed image may be tinted in a partially transparent tint to show the paint while not totally obscuring the underlying image. The highlight designates a region of the image whose opacities and colors are uncertain. The remainder of the image (the foreground region 25 containing the baby's head and the background region 26) are assumed to be accurately represented by the actual color values of pixels in those regions of the image. The uncertain pixels (those pixels which lie in the outline region) will potentially be modified to have new opacities and colors. The highlight is intended to encompass all questionable pixels. Regions bordering the highlighted region are intended not to be in question; they contain only either background or foreground pixels, and may have significant color variations. The highlighted region may also encompass background or foreground pixels. Consequently, the entire region may be painted in a somewhat careless fashion. The user need not scrupulously follow every contour of the baby's head.

Figure 4:
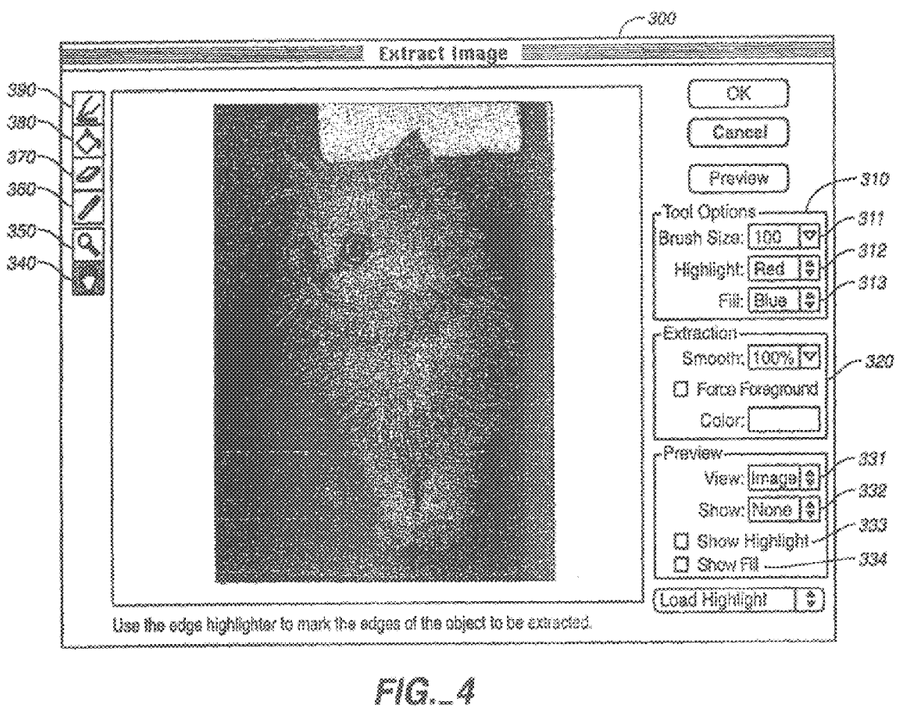

Referring to FIG. 4, a user interface dialog box 300 provides the user with tools to assist with highlighting. These tools include: an edge highlighter 390 for defining a highlight region; an eraser 370 for editing the highlight region; a zoom tool 350; and a hand tool 340 for panning an image onscreen. The user may also select brush diameter 311, highlight color 312, and foreground fill color 313 as separate tool options 310. Also included within the interface 300 are preview options 330 which allow the user to view: the original image or extracted result 331; the background image 332; the highlight region 333; and the foreground fill color 334.

User Selects Sample Colors Associated With the Foreground or Background 56

As shown by the screen shot in FIG. 4, a user interface dialog box 300 allows the user to select 320 sample colors to be associated with the foreground, background, or both. Foreground and background color may also be selected using an eyedropper tool 360 located within the interface 300. The invention can operate in several color choice modes:

a) The user may select the foreground color. This is useful for foreground objects which have a small range of color variation, such as a water fountain where bright white colors often predominate. It is also useful in touching up an extraction with the interactive brush described below.
   b) The user may select the background color. This is useful in touching up an extraction with the interactive brush in circumstances in which the background colors are not adequately represented by colors outside and nearby the uncertain region.
   c) The user may select colors for the foreground and other colors for the background. This is useful to speed an extraction for the special case of uniformly colored background and foreground or for the special case in which the foreground and background contain relatively few colors.
   d) The user may select no colors. An algorithm selects all colors automatically. This is the normal mode of operation for complex objects in complex backgrounds.

User Designates Foreground or Background Point in Image 58

Figure 5:
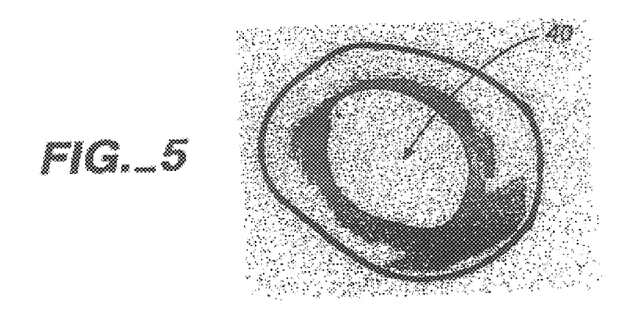

As shown in FIG. 5, the user selects a single pixel 40 in the image to designate that location as belonging to the foreground-object or selects multiple pixels to designate multiple locations of foreground portions of the object or of multiple objects. Alternatively (as set by a user preference), the location may designate the background region. Referring to FIG. 4, this designation may be achieved by using the fill tool 380 provided in the user interface 300. The algorithm then segments the entire image or a portion of the image bounding the selection into three separate regions: foreground, uncertain, and background.

Program Automatically Extracts Foreground Object From Background Scene 60

Figure 6:
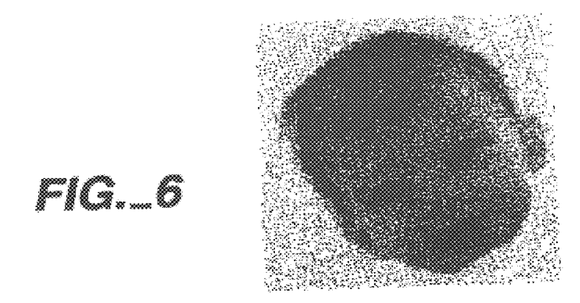

As shown in FIG. 6, the next step is an automatic extraction of the foreground object from the background scene in the original image. For each pixel in the uncertain region, a combined search and error minimization process determines the color of two pixels, one in the foreground region and one in the background region. These are chosen to minimize an error criterion (described below) or alternatively to maximize a probability or likelihood criterion. Having found these two optimal pixels, their colors are used to find the opacity and color of the pixel in question by applying a blending model (many blending models can be accommodated).

User May "Touch up" Image Using Brush Tools 62

Figure 7:
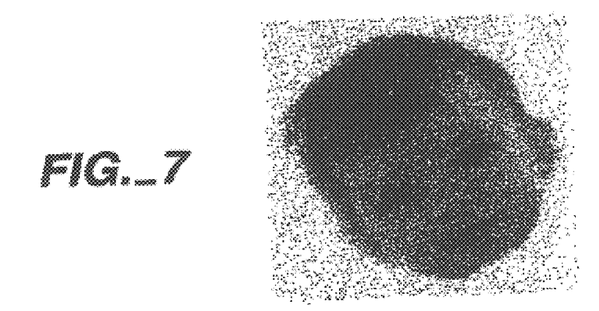

As shown in FIG. 7, after the color extrapolations have been completed, an interactive brush tool may be used to perform the extraction locally (within a brush radius, which can optionally be controlled by the user). If performed after extraction of the full image in FIG. 6, this provides a means for locally improving the extraction results. An example use involves selection of a foreground color manually and then brushing over portions of the image in which the foreground is believed to have that color. If the extraction in FIG. 6 gave imperfect results because of an inaccurate estimation of the intrinsic foreground colors, this touch up will improve the extraction. If performed before automatic extraction, this touch up provides a means of locally extracting colors, thereby avoiding the requirement of extracting the whole object from the image. The tool may extract colors only, colors and opacities, or both.

The brush operates by using the methods described for FIG. 6 but only for those pixels which lie within the brush shape. Pixels at the edge of the brush can be blended with the original image pixels to produce a smoother transition between the modified and unmodified pixels.

Figure 8:
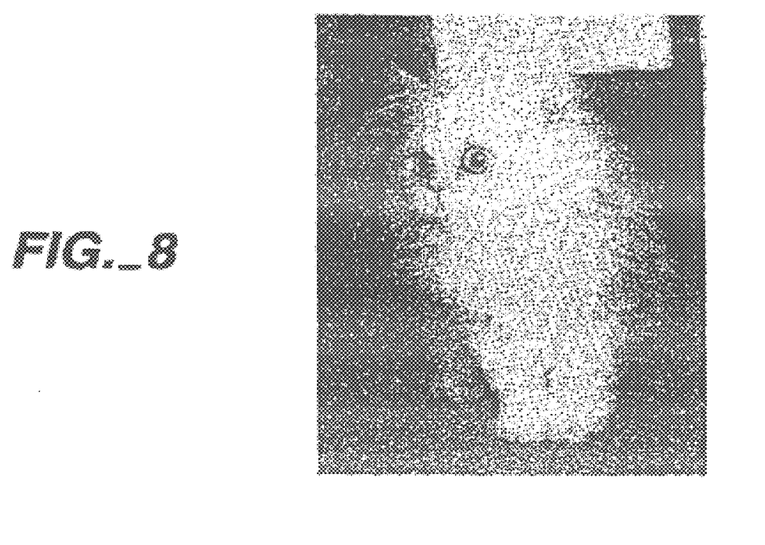
Figure 9:
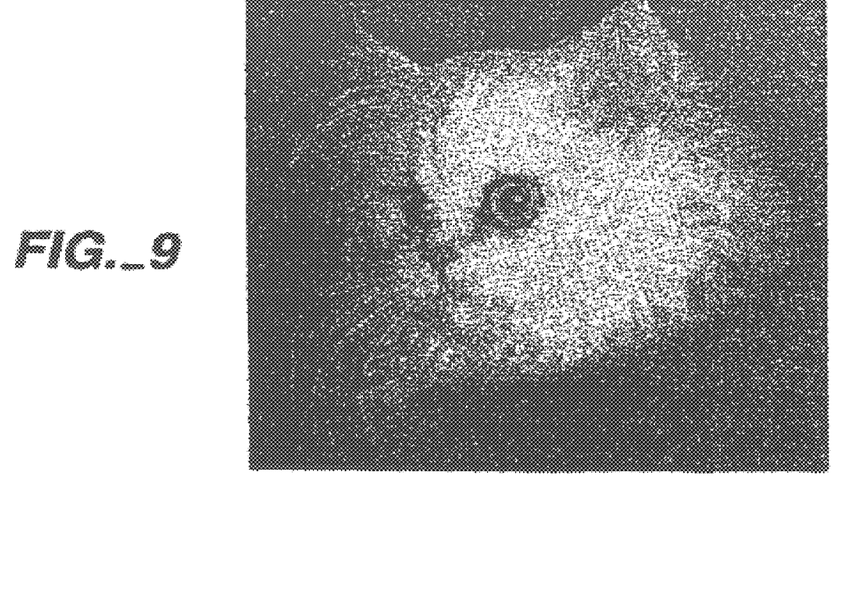

FIG. 8 shows an example of an original photo before the masking and extraction methods of the invention are applied. FIG. 9 shows the result of the invention's technique as applied to the original photo. The foreground object has been completely extracted from the original background and composited onto a new background.

Figure 10:
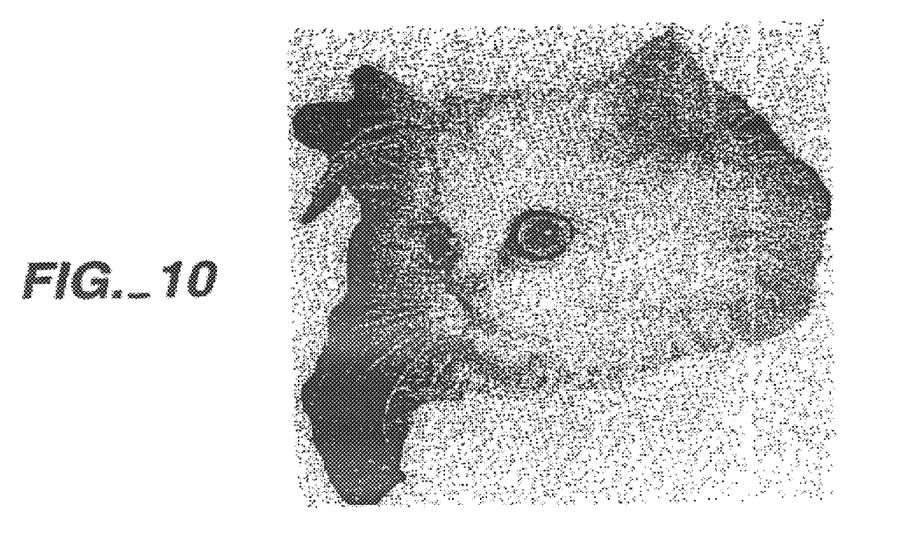

FIG. 10 shows one example of a previous extraction method whereby the foreground object cannot be completely extracted without also extracting parts of the background.

Figure 11:
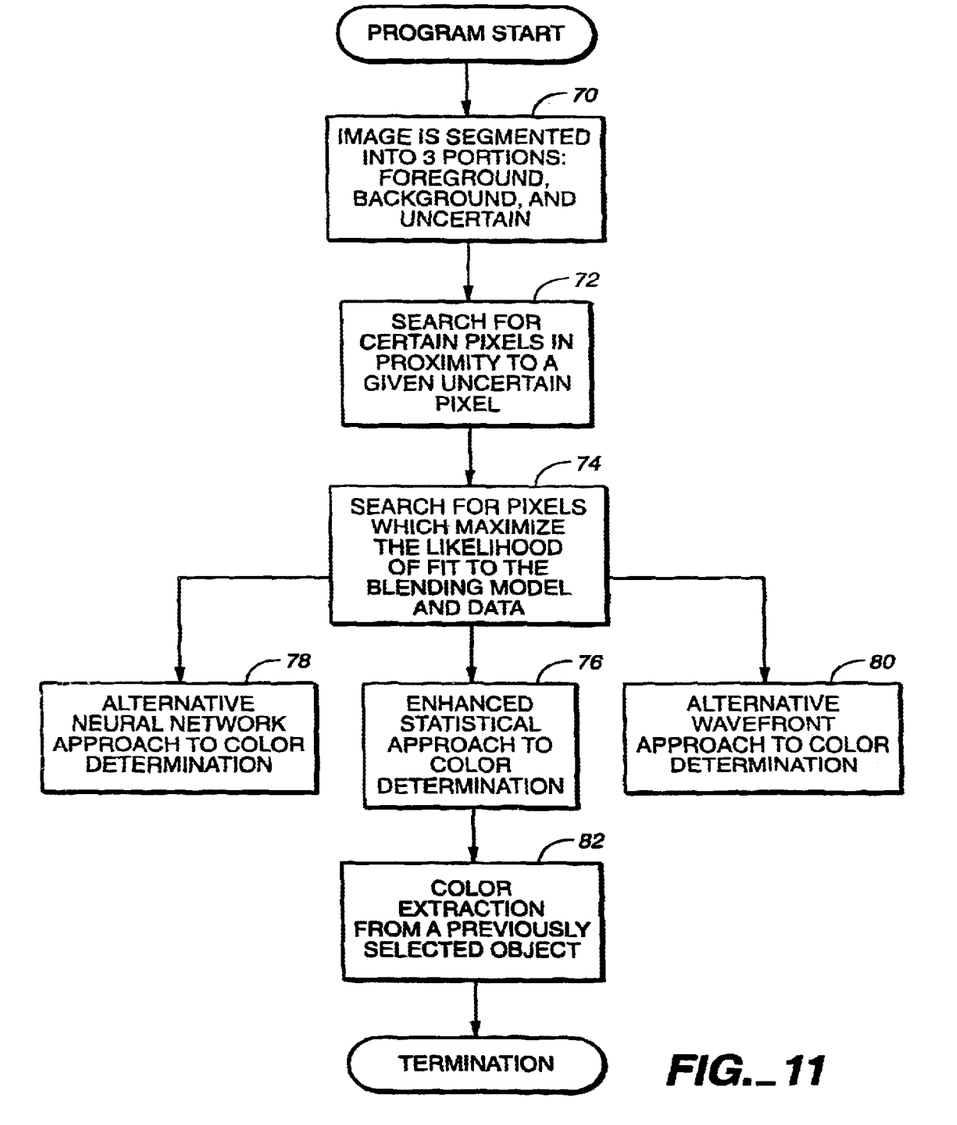

FIG. 11 is a computational flow chart tracking the methods and algorithms used to practice the invention. Each step is further described below.

Segmentation of Image Regions 70

Figure 12:
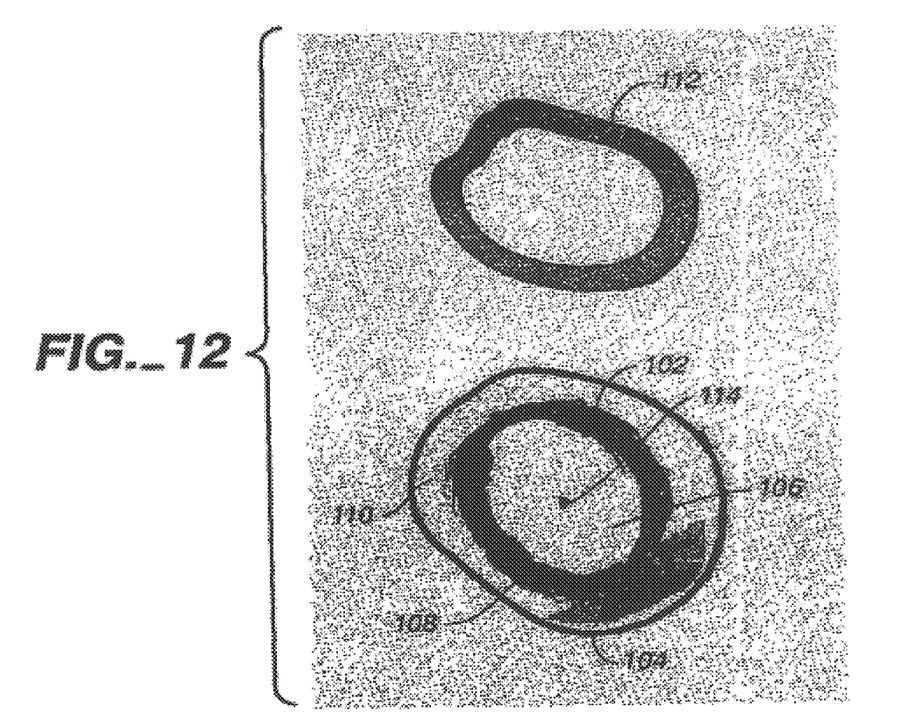

As shown in FIG. 12, given the outline 102 painted over the image 104, the image is segmented into three portions: foreground 106, uncertain 108, and background 110. The bordering foreground 106 and background 110 regions can contain significant color variations. The outline is provided as an image mask 112 having values of 0 or 1, for example, according to whether each pixel is outside or inside the outline, respectively. The mask value can be obtained by thresholding a mask that has multiple values indicative of the strength of the applied paint. Having obtained the binary outline mask 112 and with the designation by the user of a single pixel 114 as lying inside the foreground 106 (or background 110 region), the segmentation can be performed.

One segmentation implementation begins at the location of the designated foreground pixel 114 and performs a flood filling algorithm which marks all contiguous pixels 116, 118 as foreground if they have the same value (0) for the outline mask. All non-outline and non-foreground pixels are then marked as background.

Another segmentation implementation can segment multiple regions by performing an iterated series of flood fillings, alternating among foreground, outline, and background masks. This approach can accommodate mask topologies of higher genus (e.g., more holes). In yet another method, the user selects multiple pixels to designate multiple locations of foreground portions of the object or of multiple objects. Different determinations are made depending upon whether the background pixel or the foreground pixel is used as the starting location. This choice can be made as a user option. Alternatively, one option can be chosen as the default operating method and the user can manually select regions whose interpretation it is desired to change.

Search for Certain Pixels in Proximity to a Given Uncertain Pixel: the Proximal Pixel Transform 72

Figure 13:
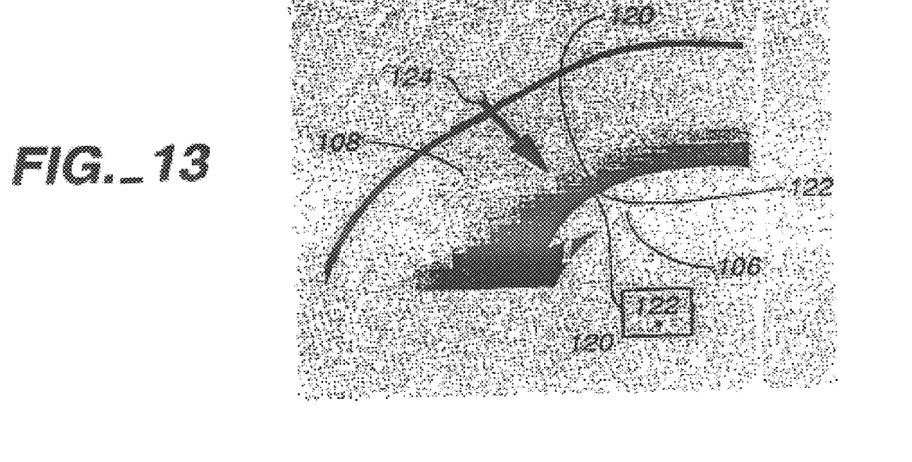

As shown in FIG. 13, one implementation of the extraction algorithm involves finding, for each uncertain pixel 120, its closest neighbor 122 in the foreground region 106 and also its closest neighbor 124 in the background region 108. This can be implemented by a spiral search procedure, which checks neighboring pixels of ever increasing radius from the uncertain pixel, to test whether they belong to foreground or background. The first pixel 128 that meets the foreground criterion (i.e., the first pixel with an opacity value of 255) is selected as a foreground representative and the first pixel 130 that meets the background criterion (i.e., the first pixel with an opacity value of 0) is selected for the background. The spiral procedure scales poorly to large image regions. It can require a number of mathematical operations which grows quadratically with the image area.

A more efficient method is a variation upon a dynamic programming algorithm used to find closest neighboring distances for each pixel in an image (this is the Euclidean Distance Transform; see Per-Erik Danielsson, "Euclidean Distance Mapping", Computer Graphics and Image Processing, 14, 227–248, 1980). The method calculates the distances and the coordinates of the closest pixels. The method has been applied to object recognition and template matching (G. Wilensky and R. Crawford, "Development of the transformation invariant distance for image comparison", presented at the Fourth International Conference on Document Analysis and Recognition, August 1997). It is used here in order to predict colors in the uncertain region. It uses the triangle inequality of Euclidean geometry to provide a technique that scales only linearly with image size.

The gist of the algorithm involves passing twice over the image with a small window 120 (3×3 pixels, for example, though larger windows produce more accurate results). The window passes from left to right to scan the image. This is repeated from the top of the image and to the bottom. The process is repeated for a scan upward but with the direction switched: right to left. As the scan proceeds, the center pixel 122 of the window is modified (in a buffer to avoid interference). Each pixel is assigned three values: the distance (D), and the X and the Y coordinates to the nearest mask pixel. To modify the center pixel 122 in the scanning window 120, its value of D is replaced by the minimum of D and the values of D for each of the nine neighbor pixels in the window, offset by the distance of the neighbor from the central pixel:

$$\text{New } D=D'=\min(D, D00+1.4, D01+1, D02+1.4, D10+1, D12+1, D20+1.4, D21+1, D22+1.4). \quad \text{Eq. 1}$$

We use 1.4 here as a crude approximation of the square root of 2. Each pixel (x,y) also carries along (i.e., there is an array of values for) the X and Y coordinates of its closest mask pixel. When the distances between the central pixel in the window and its neighbors (with offset) are compared, the coordinates of the central pixel are updated with those of the winning neighbor (the neighbor with the lowest value of D plus offset, if one exists); if the central pixel wins, no modification is made:

$$X(x, y) \text{ is replaced by } X(xn, yn), \quad \text{Eq. 2}$$

where xn and yn are the coordinates of the winning neighbor. With a 3×3 window, xn is either equal to x, x+1 or x−1, and similarly for yn. In an alternative implementation of the algorithms the extrapolated colors and the distance are stored at each pixel location. In this version the x and y coordinates are not needed. Whenever a distance value is updated, the color value is also updated. In this way an image is obtained from the extrapolated colors. This implementation allows further modification of this extrapolated image, such as a Gaussian blur or Diffusion-based blur to remove edge artifacts associated with the method.

The results of this two-pass algorithm are the coordinates of the closest (proximal) mask pixels for each pixel in the image. When applied separately to both the foreground and the background masks, the two-pass algorithm serves as input to the following step. (The values for D are not further needed and may be discarded at this point.)

Another aspect of the invention is the implementation of a tiled version of the color extrapolation algorithm using a double tile method. In this approach two tiles are accessed at one time. Access normally involves reading or writing the tile data from or to a memory store. The two tiles occupy successive tile locations in the image. For example, tile 1 may occupy image locations (x,y)=(0, 0 [upper left corner] to (256, 256)[lower right corner]. Tile 2 would normally occupy (256, 0) to (512, 256). These two tiles are treated as one data buffer which is used to process the image for the forward and backward sweeps of the color extrapolation algorithm. The first, initialization, phase of the algorithm can be processed with more common single tiling methods.

The forward sweep phase of the algorithm proceeds to slide a 3 by 3 pixel window over the tiles from left to right, top to bottom and carry out the forward sweep processing. Having completed the forward pass on the two tiles, tile 1 is removed and a new tile which joins tile 1 on the right side is added. In the example above, this new tile would be located at (512, 0) to (768, 256). If the tiles are relabeled so that tile 2 is now designated as tile 1 and the new tile is designated as tile 2, then we are back to the original situation of having two side-by-side tiles, and the processing repeats. In this way, the forward sweep is carried out for the whole image.

Having completed the forward pass across the whole image, double tile by double tile, the next step is to process the backward sweeps. This is done by beginning with tiles at the lower right corner of the image and proceeding in reverse to cover the image with double tiles, processing each pair with the backward sweep phase of the basic algorithm. This mirrors the forward sweep, but with vertical and horizontal directions both reflected. Another way to think about this tiling process is to imagine two neighboring tiles as forming a single domino. After a given 'domino' is processed, a new 'domino' is processed which overlaps the previous one by half the domino width. The reason for using these 'dominoes' or double tiles is that it enables propagation of information across tile boundaries. The algorithm propagates information forward along horizontal lines and backward at 45 degree angles to the vertical direction. By processing two square tiles in a row, we ensure that the first square (leftmost square for forward processing, rightmost for backward processing) will have information propagated to it from the second square. This, and the particular order of following the forward sweep with the backward sweep ensures that the appropriate distance and/or color information is propagated to each pixel in the image, even if the propagation occurs across tile boundaries.

The invention is capable of extracting images which have a large variation in color for both the foreground and background regions, in contrast to the prior-art blue-screen matting algorithms which require a small variation in color (preferably none) for the background blue screen. For this invention, the colors can vary across the full spectrum of colors available (as determined by the color gamut for the particular color mode of the image). For example, for an RGB image, red, green and blue values can each range from 0 to 255. Furthermore, the spatial variation in these values can be significant. Specifically, the values can vary a significant fraction of the total value range (0 to 255 for RGB) over spatial scales (space here referring to the image coordinates) which are of the same order of magnitude or smaller than the characteristic boundary region length scale. The latter can be taken to be a minimum thickness of the boundary region.

Search for Pixels Which Maximize the Likelihood of Fit to the Blending Model and Data 74

Beginning with the proximal foreground and proximal background coordinates for each pixel in the uncertain region a local search is performed both in color space and image region, coordinate space. The objective of the search is to determine the best estimates of two quantities, cf, the intrinsic foreground color and cb, the intrinsic background color. Given these, $\alpha$, the uncertain pixel opacity, can be determined from an assumed color blending model. A heuristic search scheme is outlined below. Let a given pixel in the uncertain region have a spatial coordinate (pixel location) given by r=(x,y) (Bold faced letters are used to designate vectors in either coordinate or color space.) For each r, the proximal pixel transform described above provides a coordinate rf=(X,Y)F, the closest pixel in the foreground mask and rb, the closest pixel in the background mask. Let the colors at these pixels be denoted as c, cf, and cb respectively. In RBG color space, for example, these vectors have three component values (red, green, blue). In CMYK color space, they are four-dimensional (cyan, magenta, yellow, black). For a grayscale image, the dimensionality is one; there is only a single intensity value. The search begins by considering a neighborhood of points near rf and a similar neighborhood near rb. From these two sets of points, we choose pairs, one from F (the foreground set) and one from B (the background set). For each pair, we have two associated colors, cf and cb which, along with c, determine the pixel opacity, $\alpha$, by application of the following linear blending model:

$$c=\alpha cf+(1-\alpha) cb. \qquad \text{Eq. 3}$$

Other blending models could be used. The details of the solution will vary from model to model. An example of an alternative model is one in which there is a separate opacity for each color channel 0 to n, such as the following:

$$c0=cf0+(1-\alpha 0) cb0, \; c1=cf1+(1-\alpha 1)cb1 \text{ etc. for } c0, c1, \ldots cn \qquad \text{Eq. 4}$$

The model of equation 4 is a simplified model which blends transparent objects containing reflected light into a background. There is no alpha factor on the foreground channels in this alternative model. The Adobe transparency model provides another example. One method of solution is to minimize the deviation of fit with respect to the model.

That is, we wish to minimize an error function, E, which, for the linear blending model, can be written as $$E=\tfrac{1}{2}[c-\alpha cf-(1-\alpha) cb]^2. \qquad \text{Eq. 5}$$

All dot products are Euclidean inner products in the appropriate color space (sum of products of components). This error measures the squared deviation in color space of the uncertain pixel color from the line separating the foreground and background colors. The solution for the opacity is $$\alpha=(c-cb)^2/(cf-cb)^2. \qquad \text{Eq. 6}$$

Given this value for $\alpha$, the resulting error can be expressed as $$E=\tfrac{1}{2}\{[c-cb]^2-\alpha^2\}, \qquad \text{Eq. 7}$$

where $\alpha$ can be considered to be the function given above. This expression for the model error, which now depends only upon c, cf, and cb, can be used to choose the pair (cf, cb) which minimizes its value. Having found such a pair, the opacity is determined from the Eq. 6. An exhaustive search through all pairs of points in the two sets F and B will give the desired color pair. However, faster greedy searching can give reasonably good solutions with less computation.

For example, the search may be carried out by iterating back and forth several times between a foreground search and a background search. The background color is initialized to be that associated with the results of the proximal search algorithm applied to the background mask for a given pixel r. This value, cb, is then used in the error expression along with c, the value at location r in the uncertain region. The search is then carried out over the foreground neighborhood set for a color which minimizes E. Having found this color, cf, it can be used in the error expression and the search continues among the background pixels to find a new color cb, which yields a reduced error measure. This procedure can be iterated several times. In practice, good results have been obtained by iterating a small number of times. For example, four iterations of this procedure, each time choosing three pixels from a possible neighborhood set of nine for both B and F, produces good results. In a variation of the model, E is replaced by a relative error, E', which normalizes the error to the distance between foreground and background colors:

$$E'=E/|cf-cb|^2. \qquad \text{Eq. 8}$$

This provides less weight to cases in which the foreground and background colors are farther apart. It may lead to improved color extraction in some situations.

Enhanced Statistical Approach to Color Determination 76

The method, as described above, results in a determination of an opacity and intrinsic foreground color for each pixel in the uncertain region. It does not, however, fully utilize all the information available in the image. In particular, statistical color information is available in both the foreground and background regions that can enhance the results. One approach is to use a color histogram, or color binning, technique to characterize the distribution of colors in the foreground region and similarly for the background. Color space is divided into bins. As each color in the foreground is sampled, it is placed in the appropriate bin. In one approach, colors are sampled only from a region of the foreground which is in close proximity to the uncertain region's border. Sampling is carried out only in the vicinity of the proximal pixels for a given uncertain pixel. This provides a local sampling but results in a small sample size. An alternative implementation samples around the whole periphery of the border between the foreground and uncertain regions. This usually provides a much larger sample at the expense of possible interference from distant portions of the image. Each approach has merits. The latter only requires collection of color bins once, while the former requires repetition for each pixel in the uncertain region. For either approach, the resulting color histogram, when normalized to the total number of sample points, represents an estimate of the conditional probability: pf(c) is the probability, given a pixel selected from the foreground region, F, that its color will have the value c.

$$pf(c)=p(c|F). \qquad \text{Eq. 9}$$

The above notation is read from right to left: (given F, a pixel selected from the foreground, p is the probability that its color is c. Similarly, for the background we obtain $$pb(c)=p(c|B).\qquad \text{Eq. 10}$$

The color histogram can be of a dimension equal to or less than that of the color space of interest. For example, for the HSV color space, a three-dimensional histogram can be collected. If the color model is not HSV, then, using standard formulas, the colors can be converted to HSV color space to obtain the hue, saturation and value. Alternatively, a simpler but often less accurate calculational approach is to approximate each color plane as independent of the other which results in a probability that is the product of the one-dimensional probabilities:

$$pf(c)=pf(\text{hue})\ pf(\text{saturation})\ pf(\text{value}).\qquad \text{Eq. 11}$$

This crude approach gives surprisingly good results. Having obtained the color histograms, or conditional probabilities, they can be used in a statistical model to obtain enhanced estimates of the extracted colors and opacities. This can be motivated by appeal to an artificial image generation model in which spatial information is ignored. The goal is to generate the pixels in the uncertain region given only the color probability distributions pf(c), pb(c), and the blending model.

Using the blending model adopted above, the error function E or E' serves to measure deviations of the color points from the blending model. A common statistical approach is to assume that additional random Gaussian noise is present in the modeling process. While this is not the sole (and maybe not even the predominant) cause of lack of fit to the model, it serves to generate a useful heuristic approach to the solution.

Accordingly, we will describe the conditional probability, given an opacity, foreground, and background colors, of finding a given color c as the blended color:

$$p(c|cf,\ cb,\ \alpha)=\exp[-\beta E].\qquad \text{Eq. 12}$$

We always have in mind the possibility of replacing E with E', the relative error measure. $\beta$ is a parameter which controls (is inversely proportional to) the amount of noise in the process.

Having characterized the statistics of the blending model, the statistical generation of colors for the uncertain region would proceed by randomly choosing an opacity according to its probability distribution function. For simplicity, this will be assumed to be unity (our best guess assuming no additional knowledge). We then choose a foreground intrinsic color, cf, with probability pf(cf) and a background color cb, with probability pb(cb). The blended color, c, is then chosen with probability equal to p(c|cf, cb, $\alpha$). This results in an overall probability of getting color c of $$P(c|F,B,\text{blend model})=\exp[-\beta E]pf(cf)\ pb(cb).\qquad \text{Eq. 13}$$

The most straightforward use of this probability is to generate an enhanced error measure to apply to the color selection algorithm. In this maximum likelihood approach, values are chosen for cf and cb and $\alpha$ which maximize this probability. This is equivalent to maximizing the logarithm of P. Hence, the negative of this logarithm serves as an error measure which is to be minimized:

$$E'=-\log P=\beta E-\log pf(cf)-\log pb(cb).\qquad \text{Eq. 14}$$

The result is an addition to the previously derived error measure E (or E') which consists of the sum of the two logarithms of the foreground and background conditional color probabilities. Now the color distributions contribute along with the deviation from the blending model in determining the best fit when the procedure described above is carried out with this new error measure. The methods involving error measures E and E' can be combined to increase the implementation speed in the following way. First, error measure E is used as explained above to find the best candidate colors, cf and cb. The resulting value of E may be small or large. If it is too large, the sample colors may not contain the intrinsic foreground color, for example. One should then rely more upon the color statistical information than trying to force the three colors to align and conform to the blending model. As a heuristic, if E is found to be larger than some threshold value (a value of 30 in RGB space produces reasonable results) then the method switches to the use of error measure E" (with $\alpha$=set to 0). This change takes additional computations but provides a more accurate opacity and intrinsic color determination.

Alternative Neural Network Approach to Color Determination 78

The previous section described an improved method for measuring the error function needed to search for and extract the intrinsic colors and opacities of pixels in the uncertain region. The improvement involved using statistical information about the color distributions in both the foreground and the background regions. Yet the correlation between spatial and color distributions was ignored. Most images of interest are recognizable because they contain combined spatial-color correlations. In other words, in trying to fill in color for an unknown region (the uncertain region in this case), random sampling from a color distribution is not the best approach. The colors form patterns which enable greater predictability of the colors of nearby pixels.

One approach to using this information is to incorporate higher-order statistical measurements which characterize higher-order correlations. An example of this approach is described below. The ability to use higher-order statistics is limited in practice by the large computational requirements which increase excessively as one tries to use higher-order information. And, except for very controlled applications, images are in general not amenable to analytic modeling.

A neural network provides a means of handling the higher-order correlated spatial-color information present in an arbitrary image. In one implementation of this aspect of the invention, we use a standard backpropagation-trained feedforward neural network (such as is described, e.g., "Rumelhart, D. E. & McClelland, J. L." Parallel distributed processing: Explorations in the microstructure of cognition, v 12, Cambridge, Mass., MIT Press, 1986).

The simplest form of the method is to consider a neural network which is trained to learn the opacity associated with pixel r (which has color c) in the uncertain region. The coordinate and color are input to the network while the opacity is the single output value: Inputs: r, c. Output: $\alpha$. A neural network with one or two 'hidden layers' of processing nodes suffices to learn an arbitrary mapping (as long as it is bounded and smooth) from inputs to output. The specific form for a network with a single 'hidden layer' is $$\alpha(r,\ c)=s(\text{weighted sum of contributions from each hidden node}+\text{offset}),\qquad \text{Eq. 15}$$

where s(x), commonly referred to as the sigmoid function, is any function which smoothly and monotonically grows from zero when x is negative infinity to one when x is positive infinity. The function provides a smooth transition between zero and one, and is usually taken to be the following function:

$$s(x)=1/[1+\exp(-x)].\qquad \text{Eq. 16}$$

The contribution from a single hidden node can be expressed in turn as a sigmoid function of a weighted sum of contributions from the inputs:

$$\text{contribution from one hidden node (labeled } j) = s(wj \ldots r + w'j \ldots c + \text{offset}),$$   Eq. 17 where the weights, wj and w'j, are parameters of the network which are trained by a gradient descent algorithm upon presentation of known values for both inputs and output. The training data is obtained from pixels in the foreground and background regions. These pixels are assigned opacity values of 1 and 0 respectively. Upon training, the network forms an approximation to a function that has values for opacity of 1 inside the foreground region and 0 inside the background. Because of the smoothness properties of the sigmoid functions, with appropriate training, the network also forms an interpolation between these two regions, allowing values to be filled in for the uncertain region. Any function, when trained using a mean squared error measure to interpolate between 0 and 1, will approximate a conditional probability. In this case, it is the probability, given a coordinate r with color c, that this combination belongs to the foreground region. One minus this probability is the corresponding probability for the background. Thus, the neural network, trained to predict the opacity, α, will provide this opacity as the conditional probability function:

$$\alpha(r, c) = p(\text{foreground}|r, c).$$   Eq. 18

This result encompasses both spatial and color information as well as possible correlations between the two.

In another approach inspired by this relation, the opacity is determined solely using the color statistical information by inverting the implied conditional probability of Eq. 18 with r not included. If spatial information is ignored, the relationship is $$\alpha(c) = p(\text{foreground}|c).$$   Eq. 19

Bayes' statistical rule (which results from simple counting arguments) allows this to be calculated from the foreground and background color probabilities given earlier:

$$P(F|c) = [p(c|F)pF]/[p(c|F)pF + p(c|B)pB].$$   Eq. 20 where pF and pB are constants which provide the probabilities of finding a foreground pixel or a background pixel of any color and are taken as unity for simplicity in this implementation of the invention. An alternative is to set them proportional to the number of pixels sampled in each region. The net result is a determination of the opacity which disregards spatial information and uses only the color distribution information obtained from the color histograms:

$$\alpha(c) = pf(c)/[pf(c) + pb(c)].$$   Eq. 21

The neural network approach allows this purely statistical result to be enhanced by incorporating spatial information as well as spatial-color correlations.

In the above description, the neural network has been used to determine the pixel opacity. Given the opacity, the intrinsic foreground color can be found by sampling the foreground and background color distributions as explained earlier to minimize the error given in Eq. 14. Alternatively, the neural network approach can be modified to extract the color information by incorporating the color blending model as a constraint. This approach utilizes a modified neural network similar to the previously described neural network but also using output nodes for the foreground and background colors in addition to the opacity. Furthermore, all three outputs are constrained by the blending model which produces a value for the observed color c. The result is a neural network which takes as input both r and c and produces as output the opacity as well as c itself. This is a variation upon a common class of neural networks which, upon training to give an output that reproduces the input, learns useful information in the internal nodes. In this case, by training to learn the opacity and to reproduce the observed color, the network produces approximations for cf and cb, the intrinsic colors, as well.

Alternative Wavefront Approach to Color Determination 80

Figure 14:
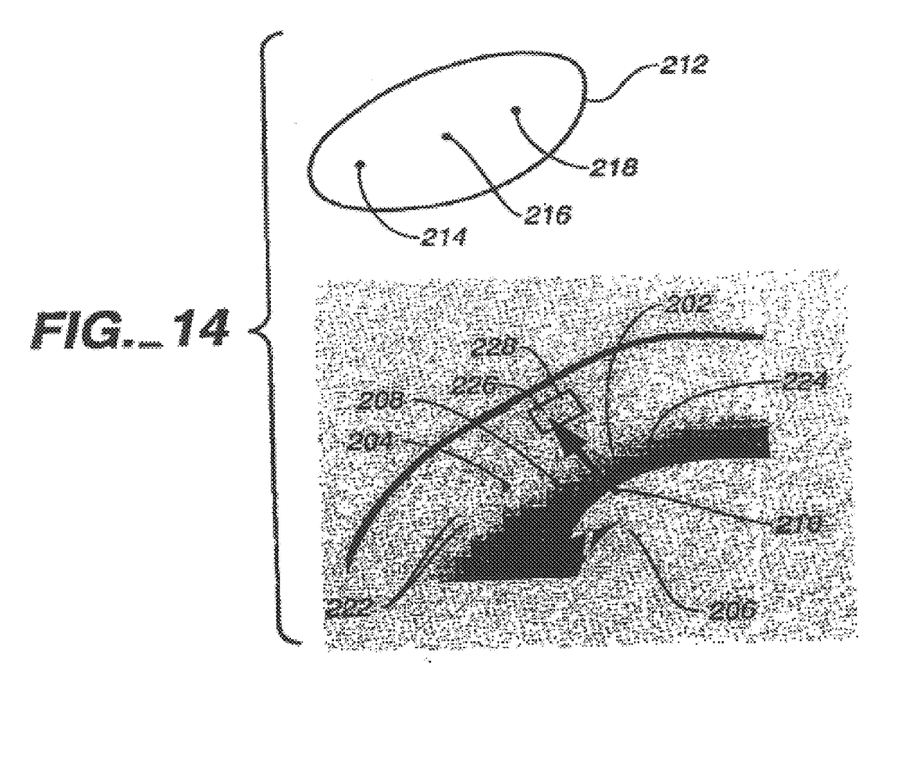

The methods presented above rely on searching for pixels in the foreground or background mask which are closest to each pixel in the uncertain region. Color statistics were used to provide enhanced results. Mention was made of the difficulty of utilizing higher-order statistical information for further enhancement. Here, a method is described which provides a greater degree of freedom to exploit these higher order color-spatial correlations. As shown in FIG. 14, this approach utilizes the invention's estimates of color information in uncertain regions 202 and that boundary regions 204, 206 nearby to a given pixel 208 provide reasonable guesses. This can be achieved by flowing colors out from the boundaries into the uncertain region, thereby filling it up with estimates of the foreground or background colors (depending upon which boundary is used). In this wavefront implementation the boundary is grown one step at a time until the uncertain region is filled. The algorithm is applied once to determine foreground colors and then again, separately, to determine background colors. The algorithm will be illustrated for the foreground case only. Analogous steps are taken for the background case.

At each step, colors are modified along a growing wavefront 210. To keep track of the wavefront, a mask 212 is created to indicate the state of each pixel in the image. A pixel can be in one of three possible states: fixed (its color does not change) 214, changed (the color has been changed) 216, unchanged (the color can but has not yet changed) 218. The mask is initialized with all foreground pixels 220 set as fixed. These foreground pixels are taken to be those pixels which have true values of the foreground mask and which lie within a small neighborhood 222 (e.g., 3 or 5 pixels) of the uncertain region boundary. All pixels 224 in the uncertain region are labeled as unchanged. As the colors are modified in the uncertain region, the corresponding pixels will get labeled as changed.

The algorithm operates at each step by sliding an imagined window 226 over all pixels along the current wavefront. The window encloses the pixels 228 which are unchanged but which border fixed pixels or changed pixels. The center pixel in the window has its color replaced by a new color, depending upon the colors in the neighboring window pixels. The center pixel is labeled as changed and processing continues along the wavefront. The new color assignments are buffered into a new image or other storage area until one complete pass along the wavefront is completed. There are several methods for determining the new color of the center pixel.

The first is a simple first-order statistics approach in which its color is chosen randomly from those neighboring pixels in the image which are changed or fixed. This restriction to changed or fixed pixels ensures that color flows out from the boundary region into the uncertain region. Each neighboring pixel which is changed or fixed is given an equal probability of being chosen.

The method described above can be improved to take into account spatial-color correlations. One approach is to utilize second-order statistics that take into account the joint probabilities of finding two colors at two different locations. A heuristic implementation which captures some of the second-order statistics and yet is fast to implement begins with the random selection from the unchanged or fixed neighbors.

Let the central pixel be denoted by r0 and the closest color match neighbor that is fixed or unchanged be denoted by r1. These pixels stand in a spatial relationship to each other as determined by the separation vector $$r01 = r0 - r1.\qquad\text{Eq. 22}$$

Now find the pixel from the unchanged or fixed window neighbors that is closest in color to c1, the color at pixel r1. This pixel location will be denoted r2. Then replace the central pixel's color with the color at location r2+r01. This method allows the propagation along the wavefront of patterns encompassed by second order correlations among the pixels. Higher order correlations can be handled in a similar fashion.

An alternative implementation uses potentially longer range color-spatial information. In this approach a measure of edge strength and direction is calculated at each central pixel. Standard Sobel filters or more sophisticated long range measures of edge strength and direction can be used. The objective is to weight the sampling of points so that it is biased along the edge direction. This biases the flow of color along edges. The degree of bias can be controlled by weighting the probabilities according to distance from the edge. The weighting function can depend upon the magnitude of the edge strength. Stronger edges may be more heavily weighted so that the color flow is more constrained. In one implementation, the pixels are sampled with a Gaussian distribution which is a function of distance to the edge line (a line from the central pixel lying along the edge direction) centered on the line.

Color Extraction From a Previously Selected Object 82

Given an image which contains an object which has been masked out, either by this invention or by other means, but which still has color contamination, a mechanism is needed to remove this contamination by performing the color extraction independently of the opacity determination. This can be done by a variant of the method used earlier. Given the color and opacity at each pixel, we wish to find the intrinsic foreground color for those pixels which have an opacity not equal to 0 or 1. One method is to threshold the opacity in the upper and lower limits. All pixels with opacity above some value a1 will be designated foreground and all pixels with opacity below $\alpha 0$ will be designated background (example values are 0.8 and 0.2 respectively). The algorithm can then proceed as discussed earlier by searching for cf and cb from samples of foreground and background near to the pixel in question and minimizing the error measure given in Eq. 7 or 8 or 14, with $\alpha$ now fixed by the observed value.

Other implementations are within the scope of the following claims.

What is claimed is:

1. A machine-based method for use in processing a digital image, the method comprising:

enabling a user to paint an area of the digital image to identify at least an area of interest adjacent to at least one of a first region and a second region, and to identify a location which is in one of the first and second regions, one of the first and second regions comprising a foreground of the digital image, the other region comprising a background of the digital image, the area of interest being adjacent to one of the regions and including at least part of the other region, after the user has defined the area of interest, automatically estimating intrinsic colors of pixels in the area of interest based on color information for pixels in the first region and the second region, and extracting the foreground from the background based on the identification of the pixels.

2. The method of claim 1 in which the painting is done with a brush tool that can be configured by the user.

3. The method of claim 1 in which the painted area can be built up by repeated painting steps and in which portions of the painted area can be erased by the user interactively.

4. The method of claim 1 in which the user paints the area of interest and separately identifies a location which is in one of the first and second regions.

5. The method of claim 1 in which the user paints at least one of the first and second regions and the area of interest and separately identifies a color associated with one of the first and second regions.

6. The method of claim 5 in which the user identifies the color by applying an eyedropper tool to one pixel or a set of pixels in the one region.

7. The method of claim 1 in which the user designates one of the first and second regions by identifying a pixel location in that region.

8. The method of claim 1 further comprising flood filling one of the regions based on the identified pixel location to designate that region as a foreground.

9. The method of claim 1 in which one of the first and second regions comprises a foreground in the digital image, the other of the regions comprises a background of the digital image, and the area of interest is between the foreground and the background.

10. The method of claim 1 in which one of the first and second regions comprises a foreground in the digital image, the other region comprises a background of the digital image, and the area of interest is adjacent to one of the regions and includes at least part of the other region.

11. The method of claim 1 in which the painted area may be modified by a user interactively and repeatedly.

12. The method of claim 1 in which the user is enabled to paint additional areas of interest between other pairs of first and second regions.

13. A medium bearing a computer program capable of controlling a computer to process a digital image by:

enabling a user to paint an area of the digital image to identify at least an area of interest adjacent to at least one of a first region and a second region, and to identify a location which is in one of the first and second regions one of the first and second regions comprising a foreground of the digital image, the other region comprising a background of the digital image, the area of interest being adjacent to one of the regions and including at least part of the other region, after the user has defined the area of interest, automatically estimating intrinsic colors of pixels in the area of interest based on color information for pixels in the first region and the second region, and extracting the foreground from the background based on the identification of the pixels.

14. A system for use in processing a digital image, the system comprising:

enabling a user to paint an area of the digital image to identify at least an area of interest adjacent to at least one of a first region and a second region, and to identify a location which is in one of the first and second regions, one of the first and second regions comprising a foreground of the digital image, the area of interest being adjacent to one of the regions and including at least part of the other region, after the user has defined the area of interest, automatically estimating intrinsic colors of pixels in the area of interest based on color information for pixels in the first region and the second region, and extracting the foreground from the background based on the identification of the pixels.

* * * * *